(12) United States Patent
Hakenesch

(10) Patent No.: US 6,283,407 B1
(45) Date of Patent: Sep. 4, 2001

(54) FUSELAGE NOSE FOR CONTROLLING AERODYNAMIC VEHICLES AND METHOD OF UTILIZING SAME

(75) Inventor: Peter Hakenesch, Ottobrunn (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/377,691

(22) Filed: Aug. 20, 1999

(30) Foreign Application Priority Data

Aug. 20, 1998 (DE) ............................................. 198 37 800

(51) Int. Cl.$^7$ .............................. F42B 10/02; B64C 5/00; B64C 9/00; B64C 9/08

(52) U.S. Cl. ................... 244/3.21; 244/3.1; 244/3.24; 244/3.27; 244/75 R; 244/90 R

(58) Field of Search ...................... 244/3.1, 3.15, 244/3.21–3.24, 3.27–3.29, 75 R, 87, 88, 89, 90 R, 45 R, 46, 47, 48, 49, 45 A, 3.25, 3.26

(56) References Cited

U.S. PATENT DOCUMENTS

| | | |
|---|---|---|
| 3,642,234 | 2/1972 | Kamber et al. . |
| 4,786,009 | 11/1988 | Rao et al. . |
| 4,917,333 * | 4/1990 | Murri ................................. 244/75 R |
| 5,139,215 * | 8/1992 | Peckham ............................ 244/3.21 |
| 5,322,243 * | 6/1994 | Stoy .................................. 244/75 R |

FOREIGN PATENT DOCUMENTS

| | | |
|---|---|---|
| 1956173 | 5/1971 | (DE) . |
| 2917096A1 | 10/1980 | (DE) . |
| 2244968A * | 12/1991 | (GB) ............................. F42B/10/02 |

* cited by examiner

Primary Examiner—Bernarr E. Gregory
(74) Attorney, Agent, or Firm—Crowell & Moring LLP

(57) ABSTRACT

A control system for aerodynamic vehicles has a fuselage nose segment and at least one strake. The fuselage nose segment is rotationally adjustable with respect to the aircraft fuselage. The at least one strake is mounted on the fuselage nose segment so that the strake can swing out.

16 Claims, 3 Drawing Sheets

FUSELAGE NOSE FOR CONTROLLING AERODYNAMIC VEHICLES AND METHOD OF UTILIZING SAME

BACKGROUND AND SUMMARY OF THE INVENTION

This application claims the priority of German application 198 37 800.9, filed in Germany on Aug. 20, 1998[, the disclosure of which is expressly incorporated by reference herein].

The invention relates to a fuselage nose for controlling aerodynamic vehicles, Preferred embodiments relate to such a fuselage nose for missiles.

See German Patent Documents DOS 1956173 and DOS 2917096, as well as U.S. Pat. Nos. 3,642,234 and 4,786,009 for background prior art.

A high-performance aircraft is disclosed in U.S. Pat. No. 3,642,234, said aircraft having a slat arrangement in its forward fuselage area that can be retracted and extended. This arrangement, in the extended state, serves to increase positive pitch in certain flying states.

A beam-controlled aircraft with control and/or trim flaps located in the vicinity of the cockpit is known from DE-OS 19 56 173, said flaps being mounted so that they can be folded down in such fashion that they are identical in the folded state with the outer skin of the aircraft fuselage.

A method and/or device for controlling the yaw of an aircraft is known from U.S. Pat. No. [4,78,009] No. 4,786,009, said method or device being provided for high angles of attack at which the control surfaces of the aircraft are ineffective. Two battens are provided symmetrically with respect to one another and movably on the forward fuselage segment in order to produce vortices at the forward part of the fuselage in a controlled fashion. The deflections of the two battens are controlled antisymmetrically in order to produce asymmetric vortices at the forward part of the fuselage, and therefore yaw forces.

An aircraft with a sensor device for monitoring a landscape to be overflown is known from DE-OS 29 17 0 96. The aircraft has a nose which is rotatable around the lengthwise axis, with a tip that is pivotable around a transverse axis and carries the sensor device. The underside of the nose is provided with a viewing shaft for monitoring, tracking, and angular or fire guidance directed rearwardly over a wide angle.

The flight range of conventionally controlled aerodynamic vehicles is limited in the higher angle of incidence range, that is, at angles of incidence as high as above 45°, among other things, by the elimination of the effectiveness of the vertical rudder. As a measure for increasing the flyable angle of incidence range, the thrust vector control is known from prior art. However, such solutions require very high expenditures with respect to equipment and control.

It is therefore an object of the invention to provide technical measures which are as simple as possible and by means of which the angle of incidence range which can be flown by aerodynamic vehicles can be increased.

This object is achieved according to preferred embodiments of the invention by providing a control system for aerodynamic vehicles having a fuselage nose segment and at least one strake, wherein the fuselage nose segment can be rotationally adjusted with respect to an aircraft fuselage and the at least one strake is mounted on the fuselage nose segment so that it can be swung out.

Other advantageous features of preferred embodiments of the invention are described below and in the claims.

The invention has the advantage that it can be implemented by means of relatively low constructive and equipment-related expenditures. The invention has a considerable control potential as the result of the fuselage nose strakes specifically in the angle of incidence range at which the conventional vertical rudder has already completely lost its function. By means of the fuselage nose strakes according to the invention, not only yawing movements of the aerodynamic vehicle can be introduced but, in the presence of an angle of yaw, the rotary movement about the normal axis can also be guided out.

Other objects, advantages and novel features of the present invention will become apparent from the following detailed description of the invention when considered in conjunction with the accompanying drawings.

DETAILED DESCRIPTION OF THE DRAWINGS

Figure 1:
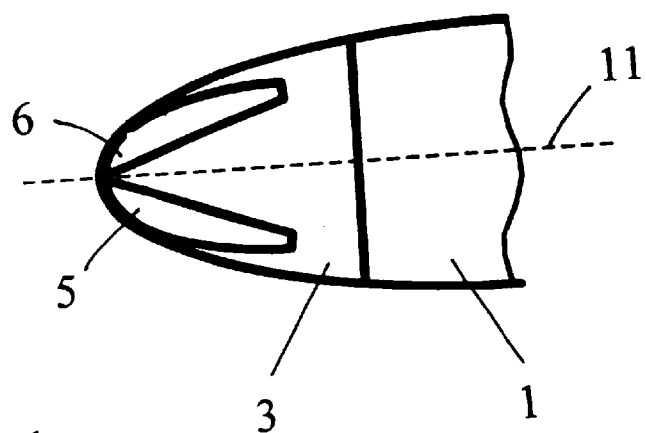
FIG. 1 is a top view of the forward portion of an aircraft fuselage with the fuselage nose segment and swing-out strakes, constructed according to preferred embodiments of the invention.

FIG. 1 schematically illustrates the forward portion of an aircraft fuselage 1 on which a fuselage nose segment 3 is mounted to be rotationally adjustable within a predetermined angle range. In this illustrated embodiment at least two swing-out strakes 5, 6 are arranged on the fuselage nose segment 3.

Preferably, each strake 5, 6 is mounted in the area of the tip, that is, viewed in the flight direction, in the forward area of the fuselage nose segment 3. As an alternative, one or several strakes 5, 6 may also be mounted at a different point of the fuselage nose segment 3.

Figure 2:
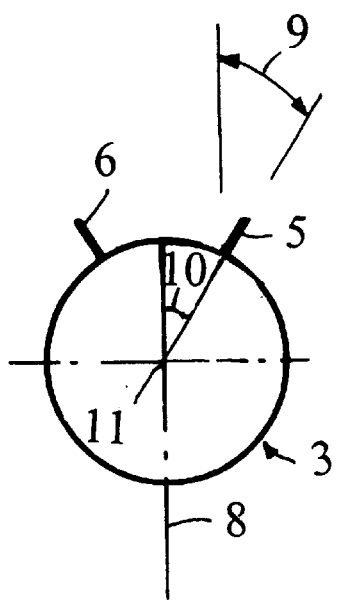
FIG. 2 is a schematic representation of the fuselage nose with two strakes which are viewed from the front and illustrated in a simplified manner, the two strakes being shown in a moved-out position.

In the center position of the rotationally adjustable strakes 5, 6 illustrated in FIG. 1, the strakes 5, 6 extend symmetrically to the normal axis 8 of the aircraft fuselage 1. The strakes are mounted on the fuselage nose segment 3 so that they can swing out and, starting from a zero position, at which the strakes preferably rest against the fuselage nose segment 3, take up a momentary swing-out position. Starting from a zero position, according to the occurred rotational adjustment of the fuselage nose segment 3, the latter assumes a momentary adjusting angle 10. Since the strakes 5, 6 are mounted on the fuselage nose segment 3, they are swivelled in a momentary swing-out position 9 by the rotational movement during the adjustment of the fuselage nose segment 3 about the longitudinal axis 11 of the aerodynamic vehicle. The momentary swing-out position 9 is illustrated in FIG. 2 from the front, that is, against the longitudinal axis 11 of the aircraft.

According to the invention, only one strake or more than two strakes can also be mounted on the fuselage nose segment 3. The strakes 5, 6 are preferably arranged symmetrically to an axis which is to be determined in each case, in the case of an odd number of strakes, the longitudinal axis of a strake preferably being situated on the axis of symmetry.

The respective shape of the strakes 5, 6 depends on the application, the type of use of the aerodynamic vehicle and the flight range of the aerodynamic vehicle. In order to design the strakes to be capable of swinging out, three actuators are preferably provided in the area of the tip of the fuselage nose segment which cause a swinging movement of the strakes 5, 6. For the actuators for operating the strakes as well as for the actuators for the rotational adjustment of the fuselage nose segment 3 relative to the aircraft fuselage 1, actuators and corresponding control and supply systems according to the state of the art are provided. The swing-out movement of the strakes 5, 6, preferably takes place perpendicularly to the surface area of the fuselage nose segment 3 on which they rest in the retracted position. The swing out movement in certain preferred embodiments could be similar to the movement of swing out strakes in FIG. 3 of U.S. Pat. No. 4,786,009, which does not have a rotatable nose as in the present invention. Also, the swing out movement could be about strake pivot axes extending transverse to the nose segment longitudinal axis according to other contemplated preferred embodiments.

The control concept suggested here is based on the possibility of generating control forces and moments for the aerodynamic vehicle by means of a targeted influencing of the whirl systems which dominate the flight performance. In this case, the whirls, which start in the forward fuselage nose area, are influenced by a corresponding operating of the strakes 5, 6 such that they generate the forces and moments which are required for the introduction and leading-out of rotating movements of the aerodynamic vehicle so that they take over at least partially the function of the vertical rudder.

For implementing a desired flying maneuver and for generating the required swirl systems, the strakes 5, 6 must be positioned at an optimal angle position as a function of the respective approach flow conditions. The momentary angle position is the result of the momentary adjusting angle 10 of the fuselage nose segment 3 and of the momentary swing-out position 9 of the strakes 5, 6. This occurs in that the fuselage nose segment 3 with the at least two swing-out strakes 5, 6 is rotated preferably continuously about an angle 10 within a defined angle range about the longitudinal axis 11 of the aircraft with respect to the aircraft fuselage 1 and the strakes 5, 6 are continuously brought into a swing-out position 9 which changes continuously, among other things, according to the flight condition. The momentary strake position with the adjusting angle 10 of the fuselage nose segment 3 and the swing-out position 9 takes place by means of the approach flow quantities detected in corresponding devices according to the state of the art, and by means of the detected actual flight condition as well as on the basis of the desired flight movement according to a previously determined law of movements.

Figure 3:
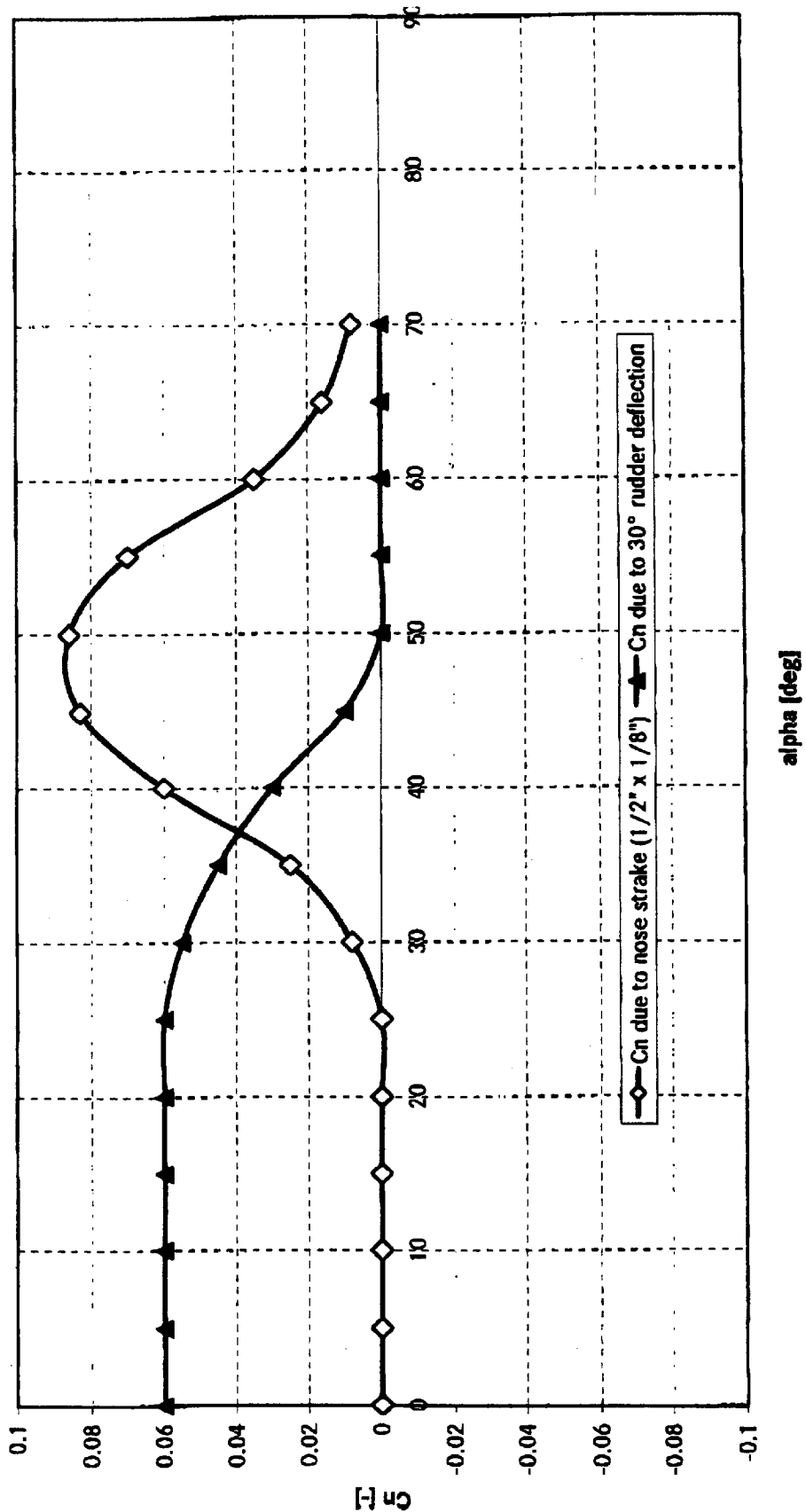
FIG. 3 is a graphical representation of yawing movement versus angle of attack for a preferred embodiment of the present invention.

FIG. 3 is a graph depicting yawing moment versus angle of attack for a wind tunnel model aircraft having a rotatable nose segment and a single strake mounted thereon constructed according to a preferred embodiment of the invention. The contribution to the yawing moment by the rudder and the strake are represented. As can be seen, the effectiveness of the rudder decreases to zero at high angles of attack about 50°. On the other hand, the effectiveness of the nose strake increases to provide significant yawing moment for high angles of attack.

Figure 4:
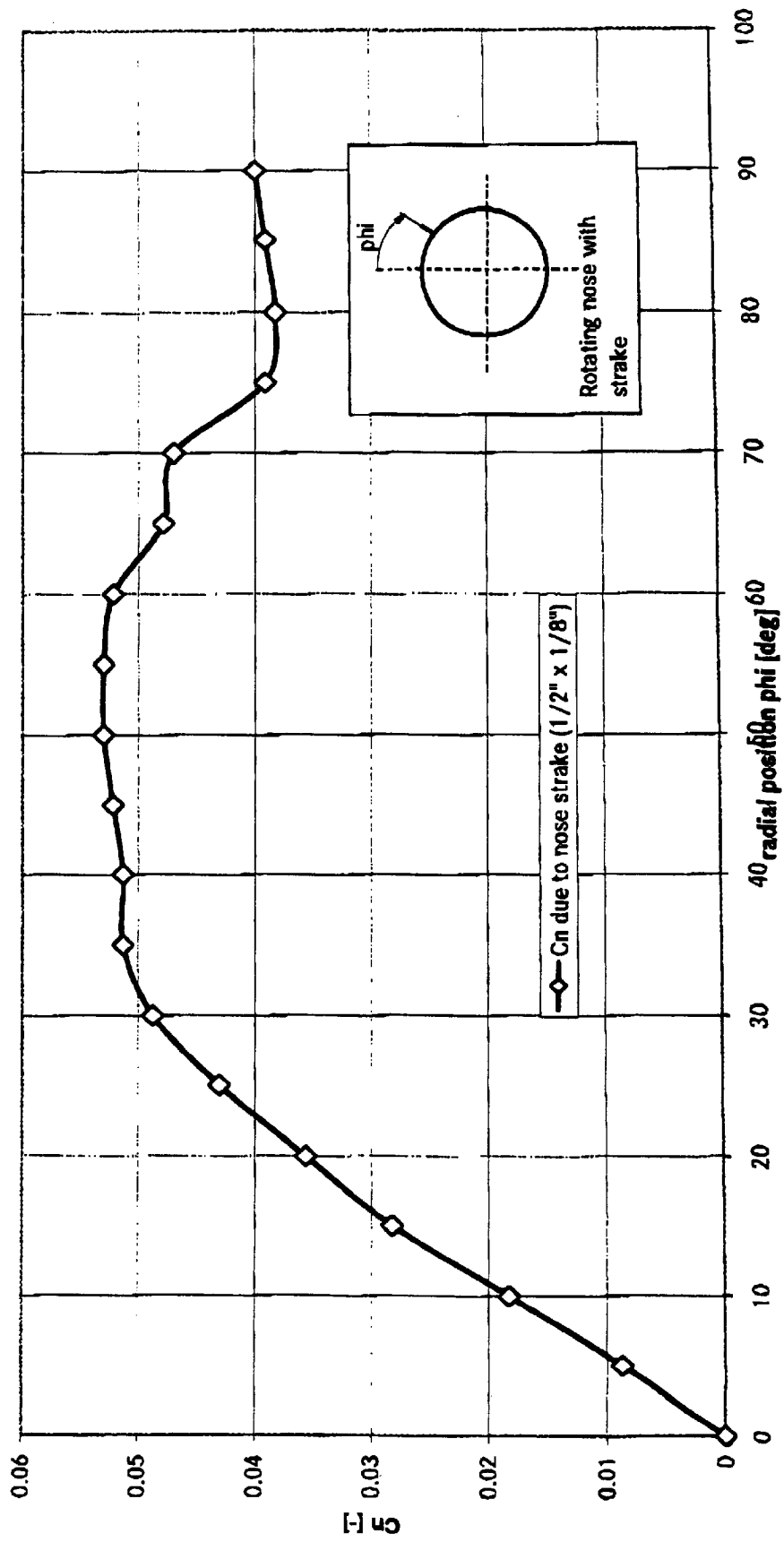
FIG. 4 is a graphical representation of yawing movement versus radial strake position for a preferred embodiment of the present invention.

FIG. 4 is a graph depicting yawing moment contributed by the strake versus the radial strake position for a wind tunnel model aircraft having a rotatable nose segment and a single strake mounted thereon, constructed according to a preferred embodiment of the invention.

FIGS. 3 and 4 are examples of results utilizing preferred embodiments of the present invention. Actual results will depend on the aircraft configuration and the number, size and disposition of the strakes in the rotatable nose segment.

An elimination or at least a reduction of the rudder unit which is achieved by the strakes used for controlling the airplane, in addition to reducing the overall structural weight and the total drag, also leads to a reduction of the radar signature in the lateral aspect of the radar signature and of the wave resistance in the supersonic range.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Control system for aerodynamic vehicles having a fuselage nose segment and at least one strake,
   wherein the fuselage nose segment is rotationally mounted with respect to an aircraft fuselage and the at least one strake is pivotally mounted on the fuselage nose segment so that there is an inoperative position and a plurality of operative positions for the at least one strake.

2. Control system for aerodynamic vehicles according to claim 1,
   wherein the at least one strake is pivotally mounted on a forward area of the fuselage nose segment.

3. Control system for aerodynamic vehicles according to claim 2,
   wherein a plurality of strakes are provided which are symmetrically mounted on the fuselage nose segment.

4. Control system for aerodynamic vehicles according to claim 3, wherein a rotating angle of the fuselage nose segment relative to the aircraft fuselage and a swing-out position of the at least one strake are obtained automatically on the basis of adjusting signals of the control system situated on board the aerodynamic vehicle.

5. Control system for aerodynamic vehicles according to claim 2,
   wherein a rotating angle of the fuselage nose segment relative to the aircraft fuselage and a swing-out position of the at least one strake are obtained automatically on the basis of adjusting signals of the control system situated on board the aerodynamic vehicle.

6. A method of controlling an aerodynamic vehicle using the control system of claim 5, said method including rotating the fuselage nose segment relative to the aircraft fuselage and moving the at least one strake to apply aerodynamic control forces.

7. A method of controlling an aerodynamic vehicle using the control system of claim 2, said method including rotating the fuselage nose segment relative to the aircraft fuselage and moving the at least one strake to apply aerodynamic control forces.

8. Control system for aerodynamic vehicles according to claim 1,
   wherein a plurality of strakes are provided which are symmetrically mounted on the fuselage nose segment.

9. Control system for aerodynamic vehicles according to claim 8, wherein a rotating angle of the fuselage nose segment relative to the aircraft fuselage and a swing-out position of the at least one strake are obtained automatically on the basis of adjusting signals of the control system situated on board the aerodynamic vehicle.

10. A method of controlling an aerodynamic vehicle using the control system of claim 8, said method including rotating the fuselage nose segment relative to the aircraft fuselage and moving the at least one strake to apply aerodynamic control forces.

11. Control system for aerodynamic vehicles according to claim 1,
wherein a rotating angle of the fuselage nose segment relative to the aircraft fuselage and a swing-out position of the at least one strake are obtained automatically on the basis of adjusting signals of the control system situated on board the aerodynamic vehicle.

12. A method of controlling an aerodynamic vehicle using the control system of claim 1, said method including rotating the fuselage nose segment relative to the aircraft fuselage and moving the at least one strake to apply aerodynamic control forces.

13. A control system for an aerodynamic vehicle which has a fuselage, comprising:
a fuselage nose segment rotatable with respect to said fuselage,
a strake mounted at the fuselage nose segment,
a fuselage nose segment rotating means for rotating the fuselage nose segment with respect to the fuselage, and
a strake moving means for moving the strake between an inoperative position inside the fuselage nose segment to an operative position extending outwardly of the fuselage nose segment to apply aerodynamically induced control forces in the aerodynamic vehicle.

14. A control system according to claim 13, wherein said strake is mounted at a forward end of the fuselage nose segment.

15. A method of controlling an aerodynamic vehicle using the control system of claim 14, said method including rotating the fuselage nose segment relative to the aircraft fuselage and moving the strake to apply aerodynamic control forces.

16. A method of controlling an aerodynamic vehicle using the control system of claim 13, said method including rotating the fuselage nose segment relative to the aircraft fuselage and moving the strake to apply aerodynamic control forces.

* * * * *